(12) United States Patent
Mackie

(10) Patent No.: US 8,408,836 B2
(45) Date of Patent: Apr. 2, 2013

(54) HULL JOINT CONNECTION

(75) Inventor: Kevin J. Mackie, Mansfield, MA (US)

(73) Assignee: Lockheed Martin Corporation, Bethesda, MD (US)

( * ) Notice: Subject to any disclaimer, the term of this patent is extended or adjusted under 35 U.S.C. 154(b) by 1297 days.

(21) Appl. No.: 11/834,989

(22) Filed: Aug. 7, 2007

(65) Prior Publication Data

US 2008/0052882 A1   Mar. 6, 2008

Related U.S. Application Data

(60) Provisional application No. 60/823,791, filed on Aug. 29, 2006.

(51) Int. Cl.
*F16L 23/00*   (2006.01)

(52) U.S. Cl. .................................................. 403/338
(58) Field of Classification Search ................ 102/382; 220/4.15, 562–564; 244/135 R
See application file for complete search history.

(56) References Cited

U.S. PATENT DOCUMENTS 2,836,117 A * 5/1958 Lankford .................. 220/4.15
5,499,800 A * 3/1996 Albin ........................... 269/6

* cited by examiner

*Primary Examiner* — Victor MacArthur
(74) *Attorney, Agent, or Firm* — Kaplan Breyer Schwarz & Ottesen, LLP

(57) ABSTRACT

A clamp for joining two hull sections is disclosed. In some embodiments, the clamp is realized by a bulkhead and a wedge, wherein the wedge forces the two hull sections into a seated position on the bulkhead. In some embodiments, the clamp further comprises o-rings for providing a pressure seal.

17 Claims, 3 Drawing Sheets

HULL JOINT CONNECTION

CROSS REFERENCE TO RELATED APPLICATIONS

This case claims priority of U.S. Provisional Patent Application Ser. No. 60/823,791, filed 29 Aug. 2006, which is incorporated herein by reference.

FIELD OF THE INVENTION

The present invention relates to fasteners in general, and, more particularly, to clamps.

BACKGROUND OF THE INVENTION

There are many structures that take the form of an outer shell of material supported by a support framework, such as aircraft fuselages, aircraft wings, ship hulls, submarines, pontoons, blimps, and the like. Some of these structures are typically formed by joining together multiple structural subsections (hereinafter, referred to as "hull sections") to form a whole structure. These hull sections must be joined together with high structural integrity. In many applications, the completed structure must maintain pressure integrity once assembled.

Commonly, the hull sections are joined to a bulkhead located at each seam. Each hull section is fastened to the bulkhead with numerous equally-spaced fasteners, such as rivets or screws, which are driven through the outer shell and into the rigid bulkhead located beneath. There are several problems with this method for joining the hull sections, however. First, it can be very time consuming to insert and fix the large number of fasteners required. Second, the fasteners often project above the outer surface of the shell and therefore, can perturb fluid flow along the outer surface. This is especially particularly undesirable in the case of a vessel hull, aircraft fuselage, aircraft wing, or the like. Third, the strength of each fastener is limited due to the small contact area typically associated with each fastener head. Fourth, localized fastener stress can cause weak joints and potential pressure leaks due to distortion of the outer shell. Finally, the alignment accuracy and run-out associated with this fastening technique is generally poor.

A need exists, therefore, for a fastening system that avoids at least some of the drawbacks of the prior-art.

SUMMARY OF THE INVENTION

The present invention provides an apparatus for joining two hull sections that avoids some of the costs and disadvantages of the prior art.

A clamping system in accordance with the illustrative embodiment joins two hull sections by clamping the two hull sections to a substantially rigid bulkhead. The hull sections are clamped to the bulkhead without the need for screws that protrude through the outer shell of the hull sections. In addition, the outer surface of the bulkhead forms a portion of the outer surface of the conjoined hull, which results in a smoothly continuous outer surface. As a result, the seam where the hull sections are joined does not substantially perturb fluid flow along the outer surface.

The bulkhead engages with wedges that force the hull sections together as each wedge is drawn toward the bulkhead. In addition, the bulkhead and the screws connecting it to the wedges are fitted with o-rings that seal the hull sections against pressure loss. Finally, the bulkhead includes surfaces for self-aligning the hull sections as they are clamped together.

In the illustrative embodiment, wedges are engaged with a bulkhead that has a flange and shoulders. The flange provides a positive lateral stop for the hull sections, and the shoulders provide support for each of the two hull sections to be joined. The wedge includes ramps for redirecting a vertically-directed force into a laterally-directed force that acts on each hull section. The laterally-directed forces drive the hull sections toward each other along the shoulders of the bulkhead until they abut the flange. Once the hull sections are fully-seated, they are self-aligned, mechanically robust, and sealed against pressure leaks.

A clamp in accordance with the illustrative embodiment comprises: a first hull section, wherein the first hull section comprises a first ridge; a second hull section, wherein the second hull section comprises a second ridge; a bulkhead; and a first wedge, wherein the first wedge comprises a first ramp for applying a first force to the first ridge, and wherein the first wedge comprises a second ramp for applying a second force to the second ridge; wherein a component of the first force is directed toward the second hull section, and wherein a component of the second force is directed toward the first hull section, and further wherein the first force and the second force are a function of the separation between the first wedge and the bulkhead.

DETAILED DESCRIPTION

Figure 1:
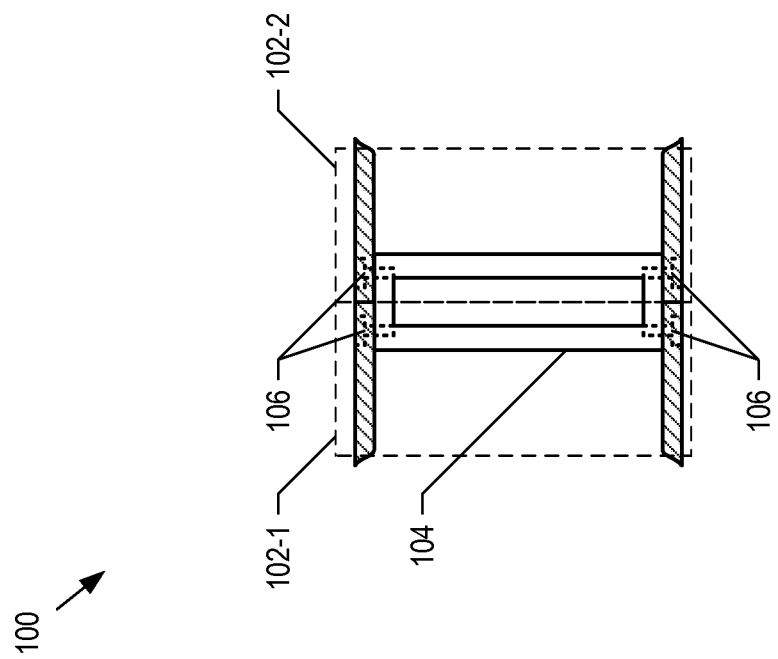
FIG. 1 depicts a schematic diagram of a portion of a prior-art mating system for joining two hull sections.

FIG. 1 depicts a schematic diagram of a portion of a prior-art mating system for joining two hull sections. Mating system 100 comprises hull section 102-1, hull section 102-2, bulkhead 104, and screws 106.

Hull sections 102-1 and 102-2 are tubular sections of sheet metal, each of which forms a cylinder with one open end. The cross-sections of the open ends of hull sections 102-1 and 102-2 are substantially identical.

Bulkhead 104 is a hoop of steel having a plurality of threaded screw holes. Bulkhead 104 has substantially the same cross-sectional shape as each of hull sections 102-1 and 102-2. The outer diameter of bulkhead 104, however, is slightly smaller than the inner diameter of the hull sections so that it can fit within each hull section. Bulkhead 104 is sized such that it can be inserted into the end of each hull section with very little clearance.

Typically, to join hull sections 102-1 and 102-2, each hull section is slipped over bulkhead 104 until their faces are in contact. Hull sections 102-1 and 102-2 are then fastened to bulkhead 104 using screws 106, which are inserted through the hull sections and into the threaded screw holes in bulkhead 104.

Figure 2A:
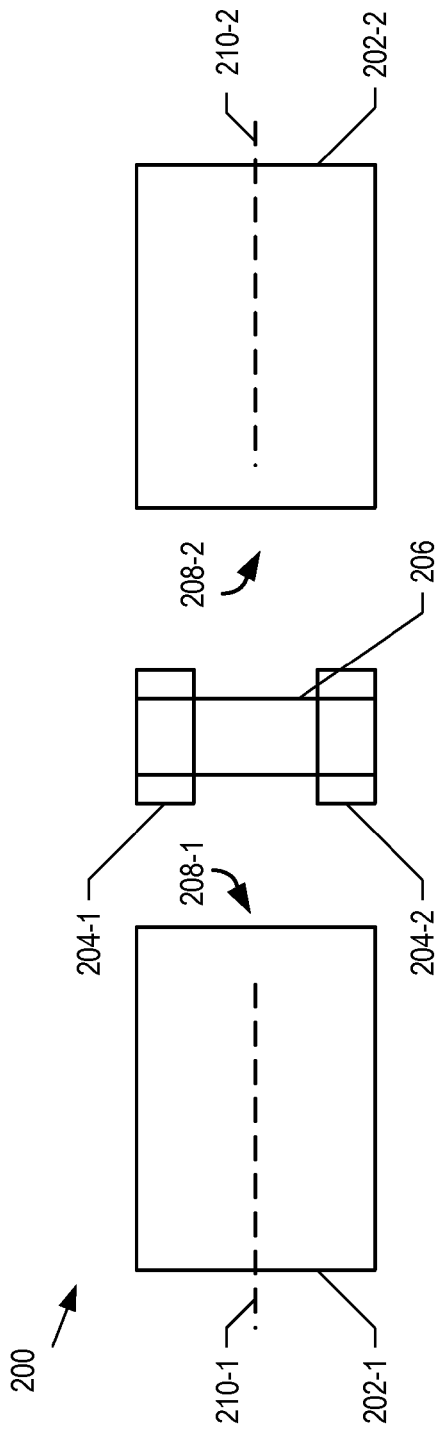
FIG. 2A depicts a schematic diagram of a mating system for joining two hull sections, prior to assembly, in accordance with an illustrative embodiment of the present invention.

FIG. 2A depicts a schematic diagram of a mating system for joining two hull sections, prior to assembly, in accordance with an illustrative embodiment of the present invention. Mating system 200 comprises hull sections 202-1 and 202-2, clamps 204-1 and 204-2 (hereinafter referred to as "clamps 204"), and bulkhead 206.

Hull sections 202-1 and 202-2 are tubular members, each having an outer shell of sheet metal. Hull section 202-1 is a cylinder having longitudinal axis 210-1 and an open end having cross-sectional area 208-1. Hull section 202-2 is a cylinder having longitudinal axis 210-2 and an open end having cross-sectional area 208-2. Cross-sectional areas 208-1 and 208-2 are substantially circular and are substantially identical. Although the illustrative embodiment comprises hull sections that are sheet metal, it will be clear to those skilled in the art, after reading this specification, how to make and use alternative embodiments of the present invention wherein hull sections 202-1 and 202-2 are a material other than sheet metal. Suitable materials for hull sections 202-1 and 202-2 include, without limitation, plastic, fiberglass, composite materials, glass, ceramics, and wood. It will also be clear to those skilled in the art, after reading this specification, how to make and use alternative embodiments of the present invention wherein cross-sectional areas 208-1 and 208-2 are other than circular and/or are not substantially identical. In some embodiments, one or both of hull sections 202-1 and 202-2 comprise regions that are not completely hollow. In some embodiments, only the ends of hull sections 202-1 and 202-2 are hollow so as to accept clamps 204.

Clamps 204-1 and 204-2 are clamps for clamping hull sections 202-1 and 202-2 to bulkhead 206, thereby fixing the position of hull sections 202-1 and 202-2 in relation to each other. Clamps 204 reside substantially within the cross-sectional footprint of hull sections 202-1 and 202-2. As a result, clamps 204 do not substantially affect the flow of fluids along the outer surface of hull sections 202-1 and 202-2. Although the illustrative embodiment comprises two clamps 204, it will be clear to those skilled in the art, after reading this specification, how to make and use alternative embodiments of the present invention that comprise any number of clamps 204. Clamps 204 are described in more detail below and with reference to FIG. 3.

Bulkhead 206 is a substantially rigid frame that has the same cross-sectional shape as cross-sectional areas 208-1 and 208-2. As described below and with respect to FIG. 3, clamps 204 comprise portions of bulkhead 206. Bulkhead 206 also provides a substantially structurally-rigid platform to which hull sections 202-1 and 202-2 are mated. In some embodiments bulkhead 206 comprises a flange to which hull sections 202-1 and 202-2 are abutted. Bulkhead 206 is described in more detail below and with reference to FIG. 3.

Figure 2B:
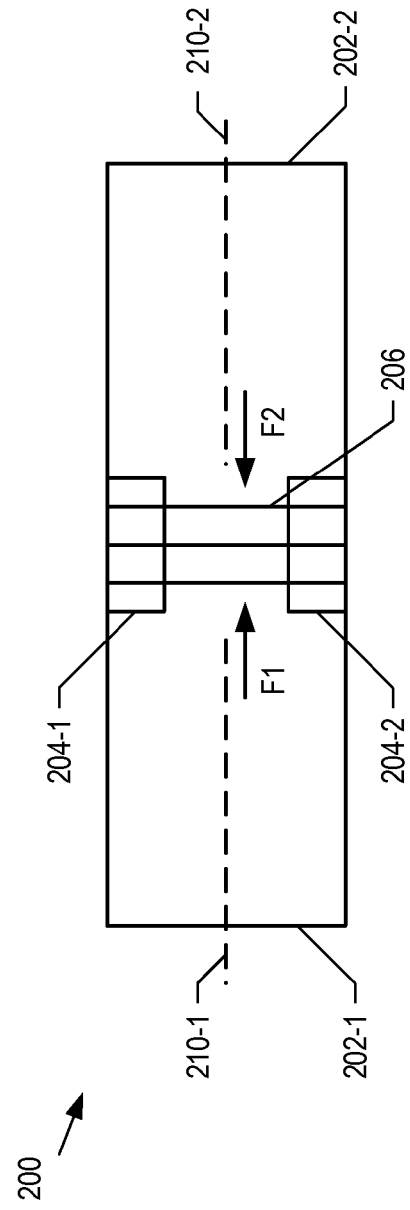
FIG. 2B depicts a schematic diagram of a mating system for joining two hull sections, after assembly, in accordance with an illustrative embodiment of the present invention.

FIG. 2B depicts a schematic diagram of a mating system for joining two hull sections, after assembly, in accordance with an illustrative embodiment of the present invention. Clamps 204 induce force F1 that is directed on hull section 202-1 in a direction toward hull section 202-2. Force F1 is directed substantially parallel to longitudinal axis 210-1 (i.e., orthogonal to cross-sectional area 208-1). In similar fashion, clamps 204 induce force F2 that is directed on hull section 202-2 in a direction toward hull section 202-1. Force F2 is directed substantially parallel to longitudinal axis 210-2 (i.e., orthogonal to cross-sectional area 208-2). Forces F1 and F2 act to move hull sections 202-1 and 202-2 together and hold them in place once assembled.

Figure 3:
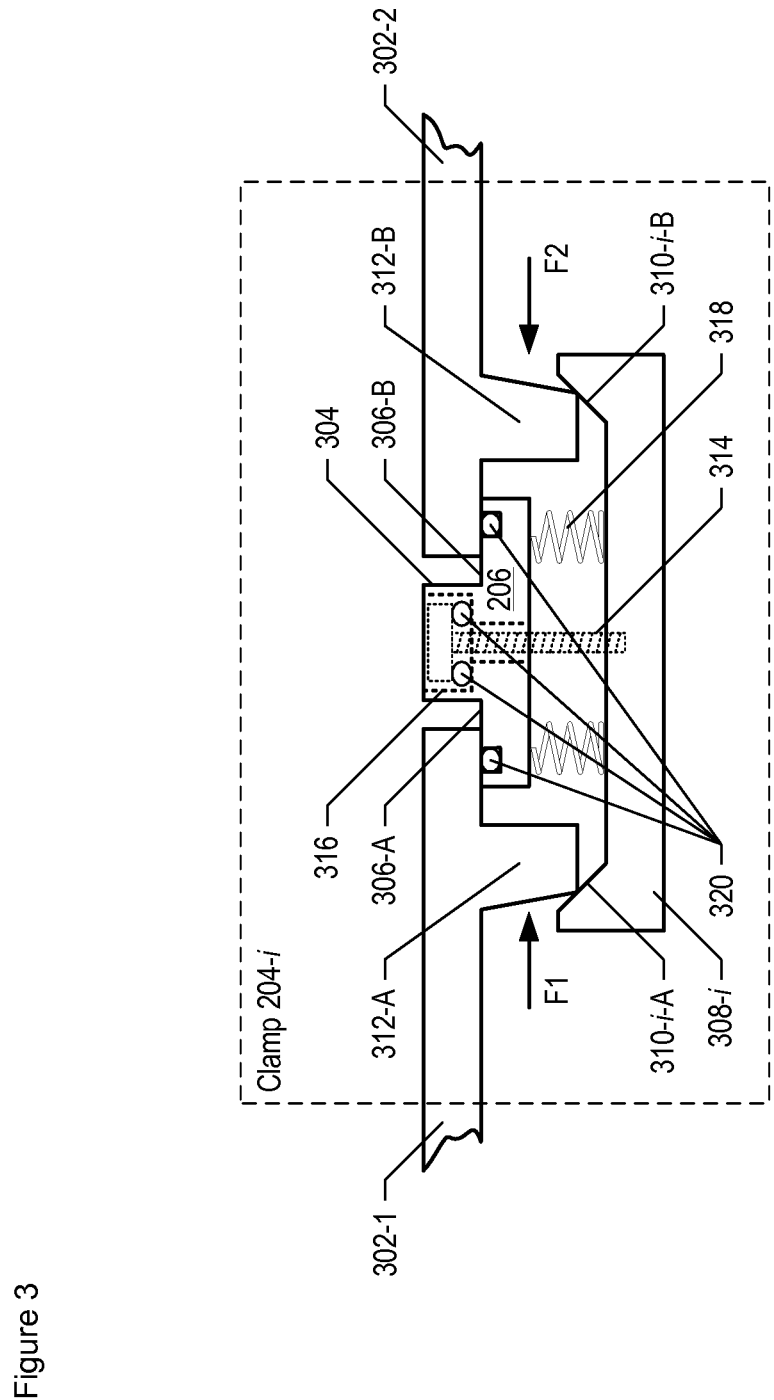
FIG. 3 depicts a clamp for joining two hull sections in accordance with the illustrative embodiment of the present invention.

FIG. 3 depicts a clamp for joining two hull sections in accordance with the illustrative embodiment of the present invention. Clamp 204-$i$ comprises bulkhead 206, wedge 308-$i$, springs 318, and o-rings 320.

Bulkhead 206 is a hoop of steel having substantially the same cross-sectional shape as cross-sectional areas 208-1 and 208-2. Bulkhead 206 includes flange 304 and shoulders 306-A and 306-B. Bulkhead 206 also includes a plurality of through-holes 316.

Flange 304 adds mechanical strength to bulkhead 206. Flange 304 also provides a mechanical stop to which hull sections 202-1 and 202-2 are abutted. The projection of flange 304 above shoulders 306-A and 306-B is substantially equal to the thickness of outer shell 302-1 of hull sections 202-1 and outer shell 302-2 of hull section 202-2. As a result, after joining the two hull sections with clamp 204-$i$, the composite outer surface is substantially smoothly continuous. Fluid flow along this outer surface is, therefore, not substantially perturbed by the presence of the clamp. In some embodiments, flange 304 is not present and outer shells 302-1 and 302-2 abut one another when joined by clamp 204-$i$. In some embodiments, the thickness of outer shell 302-1 is different that the thickness of outer shell 302-2; therefore, the projection of flange 304 above shoulders 306-A and 306-B is different.

Bulkhead 206 is sized such that shoulders 306-A and 306-B fit snugly within hull sections 202-1 and 202-2, respectively. Shoulder 306-A provides support for hull section 202-1, and shoulder 306-B provides support for hull section 202-2.

Wedge 308-$i$ is a curved plate of metal having substantially the same radius of curvature as bulkhead 206. Wedge 308-$i$ comprises a plurality of threaded holes for receiving a plurality of screws 314. In some alternative embodiments, wedge 308-$i$ comprises a single threaded hole, and wedge 308-$i$ is joined to bulkhead 206 by a single screw 314. Wedge 308-$i$ further comprises ramps 310-$i$-A and 310-$i$-B. Ramp 310-$i$-A is an angled projection positioned to mate to ridge 312-A on hull section 202-1. Ramp 310-$i$-B is an angled projection positioned to mate to ridge 312-B on hull section 202-2.

Springs 318 are coil springs for providing a separation force between bulkhead 206 and each of wedges 204-1 and 204-2. Although in the illustrative embodiment, clamp 204-$i$ comprises springs that are coil springs, it will be clear to those skilled in the art, after reading this specification, how to make and use alternative embodiments of the present invention wherein clamp 204-$i$ comprises spring elements other than coil springs.

O-rings 320 are fluoroelastomer o-rings that form a pressure seal for hull-sections 202-1 and 202-2. Although in the illustrative embodiment, clamp 204-$i$ comprises fluoroelastomer o-rings, it will be clear to those skilled in the art, after reading this specification, how to make and use alternative embodiments of the present invention wherein clamp 204-$i$ comprises pressure seal elements other than fluoroelastomer o-rings.

The operation of clamps 204 relies on the interaction of ramps 310-$i$-A and 310-$i$-B with ridges 312-A and 312-B. As wedge 308-$i$ is drawn toward bulkhead 206 (by means of screws 314), its interaction with ramp 310-$i$-A induces force F1, which forces ridge 312-A rightward (as shown in FIG. 3). In similar fashion, the interaction of wedge 308-$i$ with ramp 310-$i$-B induces force F2, which forces ridge 312-B leftward. As a result, hull sections 202-1 and 202-2 are forced into abutment with flange 304, thereby joining and holding the hull sections together.

The illustrative embodiment comprises hull sections each having a ridge for mating to wedges 308 that is continuous around its interior surface; however, it will be clear to those skilled in the art, after reading this specification, how to make and use alternative embodiments of the present invention wherein at least one hull section has a plurality of discontinuous ridge segments.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A clamp for joining a first shell and a second shell, the clamp comprising:
   (1) a bulkhead, wherein the bulkhead is separable coupleable to each of the first shell and second shell; and
   (2) a wedge, the wedge being mechanically coupleable with the bulkhead with a first separation having a magnitude that is controllable, the wedge comprising:
      (a) a first ramp dimensioned and arranged to engage a first ridge, the first ridge projecting from the inner surface of the first shell; and
      (b) a second ramp dimensioned and arranged to engage a second ridge, the second ridge projecting from the inner surface of the second shell;
   wherein the first ramp imparts a first force on the first shell when the first ramp and first ridge are engaged, the first force being directed toward the second shell, and wherein the magnitude of the first force is based on the first separation; and
   wherein the second ramp imparts a second force on the second shell when the second ramp and the second ridge are engaged, the second force being directed toward the first shell, and wherein the magnitude of the second force is based on the magnitude of the first separation.

2. The clamp of claim 1 wherein the bulkhead is dimensioned and arranged to have the same cross-sectional shape as each of a first portion of the first and a second portion of the second shell.

3. The clamp of claim 2 wherein the bulkhead is dimensioned and arranged to fit within the first portion of the first shell and the second portion of the second shell.

4. The clamp of claim 1 wherein the bulkhead comprises:
   a first shoulder, the first shoulder dimensioned to fit within a first portion of the first shell;
   a second shoulder, the second shoulder dimensioned to fit within a second portion of the second shell; and
   a flange that interposes the first shoulder and the second shoulder;
   wherein the position of each of the first shell and the second shell with respect to the flange is based on the first separation.

5. The clamp of claim 1 wherein the bulkhead comprises:
   a first shoulder;
   a second shoulder; and
   a flange, the flange having a first height above the first shoulder that is substantially equal to the thickness of the first shell, and the flange having a second height above the second shoulder that is substantially equal to the thickness of the second shell.

6. The clamp of claim 5 wherein the flange and the first ramp are dimensioned and arranged to collectively immobilize the first shell with respect to the bulkhead in response to a reduction of the first separation, and wherein the flange and the second ramp are further dimensioned and arranged to collectively immobilize the second shell with respect to the bulkhead in response to the reduction of the first separation.

7. A clamp for joining a first shell and a second shell, wherein the clamp comprises:
   a bulkhead, wherein the bulkhead is separably coupleable to each of the first shell and second shell, the bulkhead comprising:
      a first shoulder, the first shoulder dimensioned and arranged to fit within a first portion of the first shell;
      a second shoulder, the second shoulder dimensioned and arranged to fit within a second portion of the second shell; and
      a flange that interposes the first shoulder and the second shoulder; and
   a first wedge, the first wedge being mechanically coupleable with the bulkhead with a first separation having a magnitude that is controllable, the first wedge comprising a first ramp dimensioned and arranged to engage the first shell, and the first wedge comprising a second ramp dimensioned and arranged to engage the second shell;
   wherein the position of each of the first shell and the second shell relative to the flange is based on the magnitude of the first separation.

8. The clamp of claim 7, wherein the first ramp is dimensioned and arranged to apply a first force to a first ridge that is substantially immovable with respect to the first shell, the position the first shell with respect to the flange being based on the first force, and wherein the second ramp is dimensioned and arranged to apply a second force to a second ridge that is substantially immovable with respect to the second shell, the position the second shell with respect to the flange being based on the second force, and further wherein the magnitude of each of the first force and the second force is based on the first separation.

9. The clamp of claim 8 further comprising a second wedge comprising:
   a third ramp that is dimensioned and arranged to apply a third force to a third ridge that is substantially immovable with respect to the first shell, the position of the first shell being further based on the third force, and
   a second wedge comprising a fourth ramp that is dimensioned and arranged to apply a fourth force to a fourth ridge that is substantially immovable with respect to the second shell, the position of the second shell being further based on the fourth force;

wherein a component of the third force is directed toward the second shell, and wherein a component of the fourth force is directed toward the first shell, and further wherein the magnitude of each of the third force and the fourth force is based on the first separation.

10. A clamp for joining a first shell characterized by a first longitudinal axis and a second shell characterized by a second longitudinal axis, wherein a first ridge projects from the inner surface of the first shell, and wherein a second ridge projects from the inner surface of the second shell, the clamp comprising:

a bulkhead, wherein the bulkhead is separably coupleable to each of the first shell and second shell; and a wedge that is attachable to the bulkhead with a first separation having a magnitude that is controllable, the wedge comprising a first ramp and a second ramp;

wherein the first ramp is dimensioned and arranged to engage the first ridge to induce a first force on the first shell, the first force being directed along a first direction that is substantially parallel with the first longitudinal axis, and wherein the magnitude of the first force is based on the first separation; and wherein the second ramp is dimensioned and arranged to engage the second ridge to induce a second force on the second shell, the second force being directed along a second direction that is substantially parallel with the second longitudinal axis, and wherein the magnitude of the second force is based on the magnitude of the first separation.

11. The apparatus of claim 10 wherein the clamp comprises:

a first seal that provides a substantially watertight seal between the bulkhead and the first shell; and a second seal that provides a substantially watertight seal between the bulkhead and the second shell.

12. The clamp of claim 10 wherein the bulkhead comprises:

a first shoulder that is dimensioned and arranged to fit within a first portion of the first shell; and a second shoulder that is dimensioned and arranged to fit within a second portion of the second shell.

13. The clamp of claim 10 wherein the bulkhead further comprises a flange:

wherein the first ramp is dimensioned and arranged to induce a first force on the first ridge for drawing the first shell into abutment with the flange in response to a reduction of the first separation after the first ramp and first ridge are engaged; and wherein the second ramp is dimensioned and arranged to induce a second force on the second ridge for drawing the second shell into abutment with the flange in response to the reduction of the first separation after the first ramp and first ridge are engaged.

14. The clamp of claim 10 wherein the clamp further comprises:

the first ridge, wherein the first ridge is removably attachable to the first shell; and the second ridge, wherein the second ridge is removably attachable to the second shell.

15. The clamp of claim 14 wherein clamp is dimensioned and arranged to position each of the first shell and second shell with respect to the flange based on the first separation.

16. The clamp of claim 10 wherein the first ramp is dimensioned and arranged to intersect the first ridge at a non-plane-to-plane intersection.

17. The clamp of claim 10 wherein the first ramp and is dimensioned and arranged to intersect the first ridge at a line.

* * * * *